US007526768B2

(12) United States Patent
Schleifer et al.

(10) Patent No.: US 7,526,768 B2
(45) Date of Patent: Apr. 28, 2009

(54) CROSS-POLLINATION OF MULTIPLE SYNC SOURCES

(75) Inventors: Jason Evan Schleifer, Seattle, WA (US);
Preethi Ramani, Seattle, WA (US);
Zhidong Yang, Bellevue, WA (US);
Byrisetty Rajeev, Bellevue, WA (US);
Juan V. Esteve Balducci, Sammamish, WA (US); Mike Foster, Redmond, WA (US); Gary Hall, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 10/771,896

(22) Filed: Feb. 4, 2004

(65) Prior Publication Data

US 2005/0172296 A1    Aug. 4, 2005

(51) Int. Cl.
*G06F 9/44* (2006.01)
*G06F 15/16* (2006.01)
*G06F 12/00* (2006.01)

(52) U.S. Cl. .............. 719/310; 709/248; 707/201; 707/203; 717/168; 717/171

(58) Field of Classification Search ........... 719/310, 719/311, 312, 313, 319, 328; 707/201–203; 709/248; 717/168–173
See application file for complete search history.

(56) References Cited

U.S. PATENT DOCUMENTS

| | | | | | |
|---|---|---|---|---|---|
| 4,714,992 | A | * | 12/1987 | Gladney et al. ............. | 707/206 |
| 5,822,758 | A | * | 10/1998 | Loper et al. ................. | 711/130 |
| 5,867,494 | A | * | 2/1999 | Krishnaswamy et al. .... | 370/352 |
| 5,867,495 | A | * | 2/1999 | Elliott et al. ................ | 370/352 |
| 5,974,238 | A | * | 10/1999 | Chase, Jr. ................... | 709/248 |
| 5,999,525 | A | * | 12/1999 | Krishnaswamy et al. .... | 370/352 |
| 6,041,365 | A | * | 3/2000 | Kleinerman ................ | 719/328 |
| 6,260,077 | B1 | * | 7/2001 | Rangarajan et al. ......... | 719/328 |
| 6,275,957 | B1 | * | 8/2001 | Novik et al. ................. | 714/39 |
| 6,314,533 | B1 | * | 11/2001 | Novik et al. ................. | 714/39 |
| 6,317,754 | B1 | * | 11/2001 | Peng .......................... | 707/203 |
| 6,335,927 | B1 | * | 1/2002 | Elliott et al. ................ | 370/352 |
| 6,343,299 | B1 | * | 1/2002 | Huang et al. ................ | 707/203 |
| 6,367,034 | B1 | * | 4/2002 | Novik et al. ................. | 714/39 |
| 6,487,208 | B1 | * | 11/2002 | Chirashnya et al. ......... | 370/400 |
| 6,502,102 | B1 | * | 12/2002 | Haswell et al. ............. | 707/102 |
| 6,523,027 | B1 | * | 2/2003 | Underwood ................ | 707/4 |
| 6,560,720 | B1 | * | 5/2003 | Chirashnya et al. .......... | 714/32 |
| 6,598,059 | B1 | * | 7/2003 | Vasudevan et al. .......... | 707/203 |

(Continued)

OTHER PUBLICATIONS

Norman Ramsey et al.; "An Algebraic Approach to File Synchronization"; ESEC/FSE 2001, Vienna, Austria; pp. 175-185.

(Continued)

*Primary Examiner*—Meng-Ai An
*Assistant Examiner*—Jennifer N To
(74) *Attorney, Agent, or Firm*—Merchant & Gould, P.C.

(57) ABSTRACT

The present invention allows a user to synchronize a device with at least two data sources that may cross-pollinate. The user's device is used to shuttle changes between the sources and resolves conflicts when changes are made to an item on multiple sources concurrently. The user's device keeps track of which version of the item each sync source has and synchronizes each of the sources to the latest version of an item.

19 Claims, 15 Drawing Sheets

U.S. PATENT DOCUMENTS

| | | | | |
|---|---|---|---|---|
| 6,601,195 B1* | 7/2003 | Chirashnya et al. | ............ | 714/43 |
| 6,601,233 B1* | 7/2003 | Underwood | ................ | 717/102 |
| 6,609,128 B1* | 8/2003 | Underwood | ................ | 707/10 |
| 6,633,878 B1* | 10/2003 | Underwood | ................ | 707/100 |
| 6,647,432 B1* | 11/2003 | Ahmed et al. | ............... | 719/318 |
| 6,678,741 B1* | 1/2004 | Northcutt et al. | ............ | 709/248 |
| 6,701,514 B1* | 3/2004 | Haswell et al. | .............. | 717/115 |
| 6,704,873 B1* | 3/2004 | Underwood | ................ | 726/12 |
| 6,718,535 B1* | 4/2004 | Underwood | ................ | 717/101 |
| 6,725,281 B1* | 4/2004 | Zintel et al. | ................. | 719/318 |
| 6,731,625 B1* | 5/2004 | Eastep et al. | ................ | 370/352 |
| 6,754,181 B1* | 6/2004 | Elliott et al. | ................ | 370/252 |
| 6,870,546 B1* | 3/2005 | Arsenault et al. | ........... | 345/619 |
| 6,907,546 B1* | 6/2005 | Haswell et al. | .............. | 714/38 |
| 6,909,708 B1* | 6/2005 | Krishnaswamy et al. | .... | 370/352 |
| 7,100,195 B1* | 8/2006 | Underwood | ................ | 726/2 |
| 7,145,898 B1* | 12/2006 | Elliott | ........................ | 370/352 |
| 7,219,329 B2* | 5/2007 | Meijer et al. | ................ | 717/106 |
| 2002/0010807 A1* | 1/2002 | Multer et al. | .............. | 709/328 |
| 2002/0064149 A1* | 5/2002 | Elliott et al. | ................ | 370/352 |
| 2002/0078307 A1* | 6/2002 | Zahir | ......................... | 711/145 |
| 2002/0156931 A1* | 10/2002 | Riedel | ........................ | 709/313 |
| 2002/0198848 A1* | 12/2002 | Michener | ..................... | 705/75 |
| 2003/0115378 A1* | 6/2003 | Zondervan et al. | ......... | 709/328 |
| 2003/0159136 A1* | 8/2003 | Huang et al. | ................ | 717/171 |
| 2005/0033561 A1* | 2/2005 | Orofino | ........................ | 703/1 |
| 2005/0050545 A1* | 3/2005 | Moakley | ..................... | 718/104 |
| 2005/0073991 A1* | 4/2005 | Roberts et al. | .............. | 370/350 |
| 2005/0114431 A1* | 5/2005 | Singh et al. | ................. | 709/201 |
| 2005/0165884 A1* | 7/2005 | Masek | ........................ | 709/201 |
| 2006/0031927 A1* | 2/2006 | Mizuno et al. | ................ | 726/11 |
| 2006/0224775 A1* | 10/2006 | Lee et al. | .................... | 709/248 |
| 2007/0067373 A1* | 3/2007 | Higgins et al. | .............. | 707/206 |
| 2007/0180075 A1* | 8/2007 | Chasman et al. | ............ | 709/223 |

OTHER PUBLICATIONS

Edward Swierk et al.; "The Roma Personal Metadata Service"; Mobile Networks and Applications 7, 2002; pp. 407-418.

Robert C. Miller et al.; "Synchronizing Clipboards of Multiple Computers"; CHI Letters vol. 1, 1; pp. 65-66 1999.

* cited by examiner

Fig. 4

1. SYNC ONE DATA SOURCE
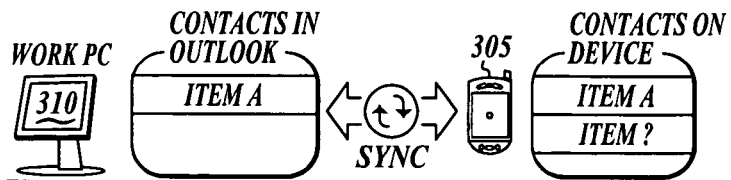

2. ADD SECOND DATA SOURCE. USER CHOOSES TO CROSS-POLLINATE AT DATA SOURCE CREATION TIME
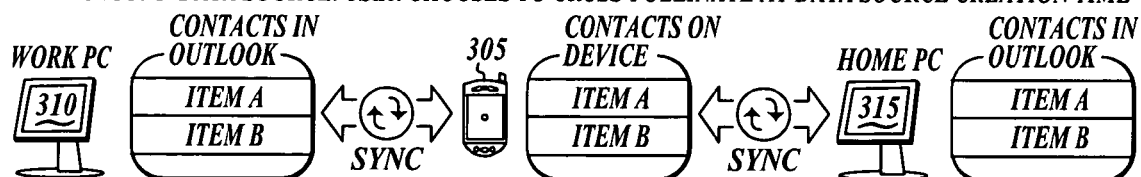

3. CHANGE ACTIVESYNC SETTINGS: ITEMS CREATED ON DEVICE SYNC TO WORK PC ITEMS FROM WORK PC & HOME PC DO NOT CROSS-POLLINATE
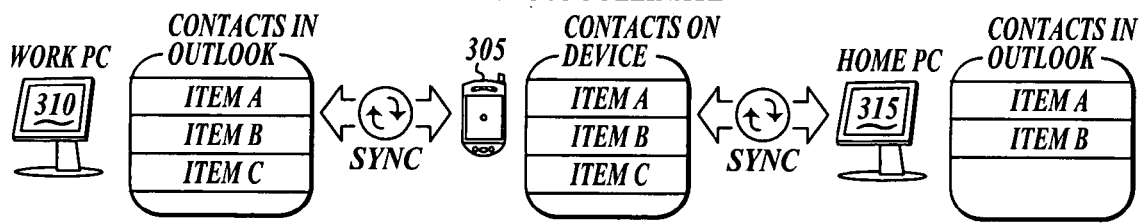

4. CHANGE ACTIVESYNC SETTINGS: ITEMS CREATED ON DEVICE SYNC TO WORK PC ITEMS FROM WORK PC & HOME PC DO NOT CROSS-POLLINATE. CREATE ITEM ON THE HOME PC
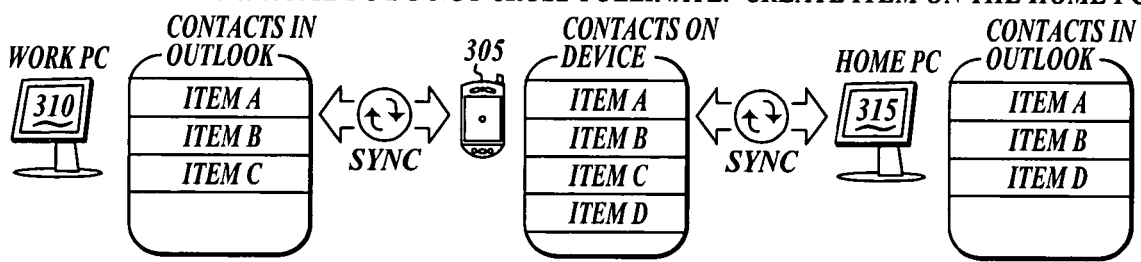

5. CHANGE ACTIVESYNC SETTINGS ITEMS CREATED ON DEVICE SYNC TO WORK PC & HOME PC. ITEMS CROSS-POLLINATE WHEN CREATED ON HOME OR WORK PCS CREATE ITEM ON THE WORK PC
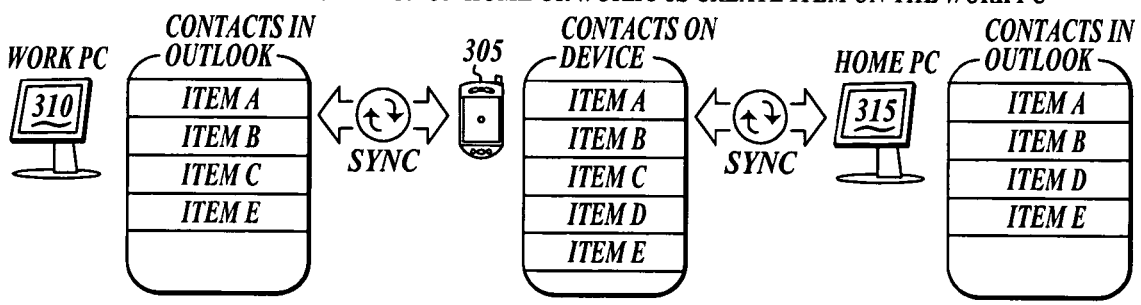

6. DELETE HOME PC DATA SOURCE (NOTE ITEM D IS REMOVED FROM THE DEVICE)
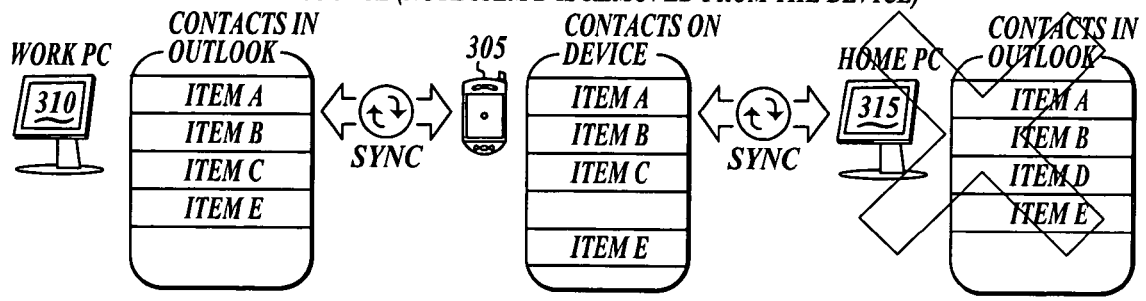

1. ITEM A HAS ALREADY SYNCED TO THE DEVICE FROM SERVER1
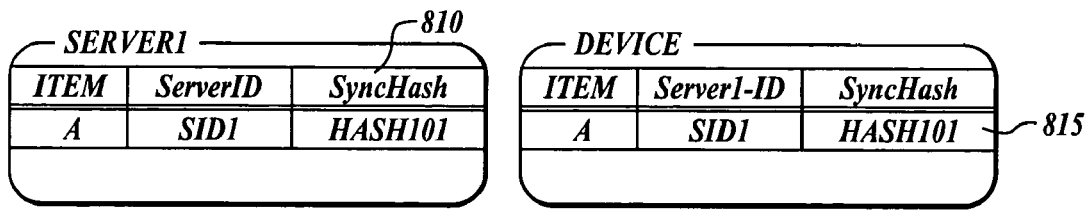
2. USER COPIES ITEM A, CREATING ITEM B WITH AN IDENTICAL SYNCHASH
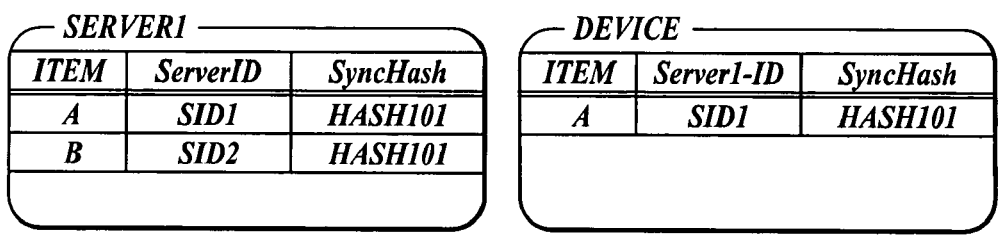
3. SYCN THE SERVER WITH THE DEVICE. ITEM B NOW SYNCS DOWN TO THE DEVICE. ALTHOUGH THE SYNCHASH MATCHES AN ITEM ON THE DEVICE, THE ITEM IT MATCHES IS ALREADY SYNCHING WITH THE SERVER, SO A NEW ITEM IS CREATED.
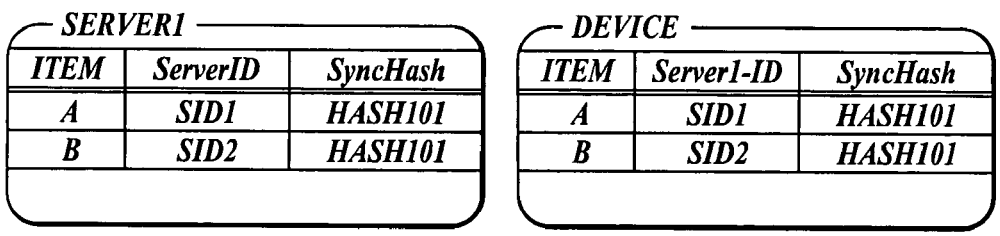
*Fig. 8*

1. V1 PROTOCOL SUPPORTS PROPERTIES A &B. V3 PROTOCOL SUPPORTS A, B &Z.

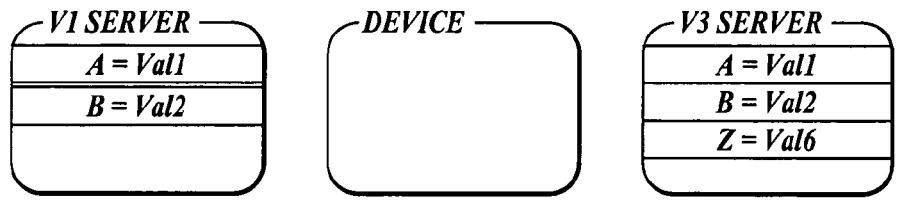

2. FIRST SYNC WITH V1 SERVER PROPERTIES A & B

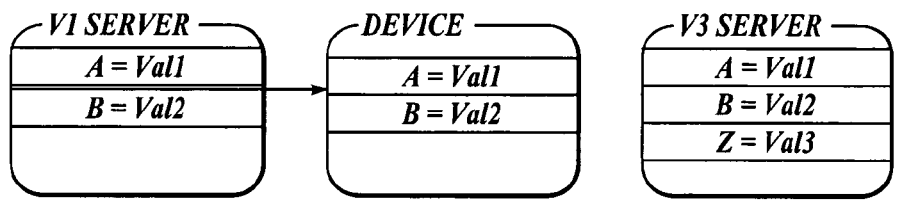

3. SYNC WITH V3 SERVER. ITEM DETECTED AS A DUPLICATE AFTER COMPARING PROPERTIES A & B. SYNC DOWN PROPERTIES A, B, Z.

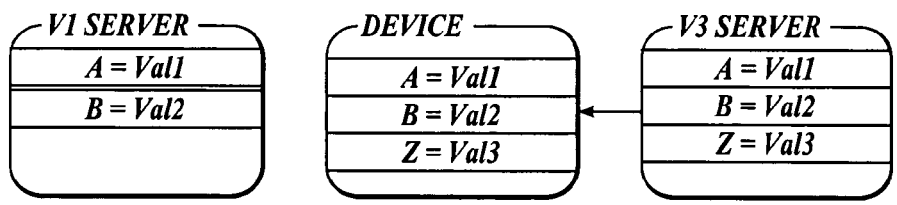

4. SQL-CE CHANGE TRACKING ON DEVICE RECORDS A CHANGE ONLY TO PROPERTY Z. WHEN DEVICE NEXT SYNCS WITH V1 IT NOTES A CHANGE TO THE ITEM, BUT NOT IN ANY PROPERTIES IT SYNCS (ONLY Z HAS CHANGED). NO ADDITIONAL SYNC OCCURS.

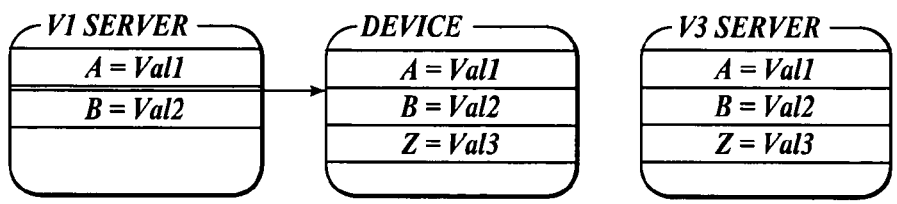

Fig.10

1. ITEM A HAS PREVIOUSLY CROSS-POLLINATED TO HOME PC & WORK SERVER
1110
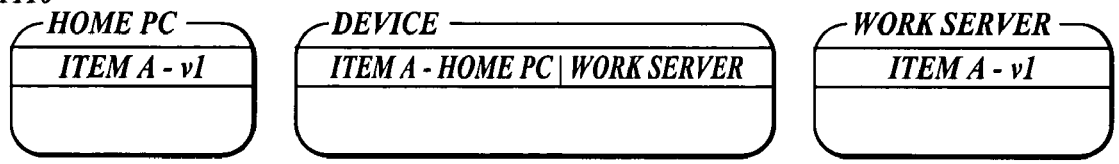
2. EDIT TIME ON WORK SERVER
1120
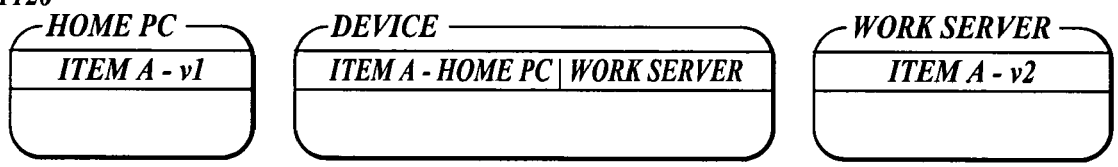
3. SYNC WITH WORK SERVER
1130
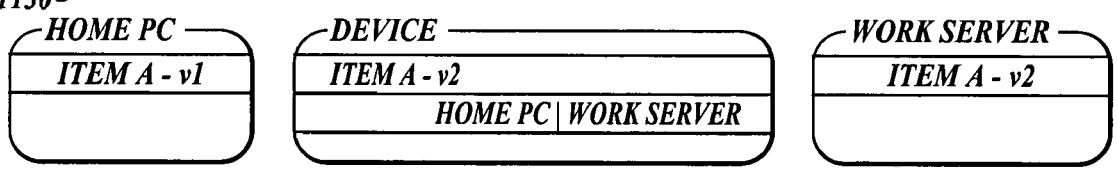
4. SYNC WITH HOME PC. DEVICE SET TO SERVER WINS. ITEM v1 NOW ON DEVICE.
1140
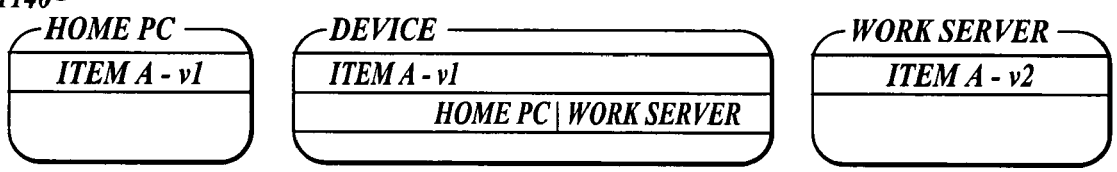
5. SYNC WITH WORK SERVER. [NO CONFLICT] ITEM v1 NOW ON WORK SERVER AS WELL.
1150
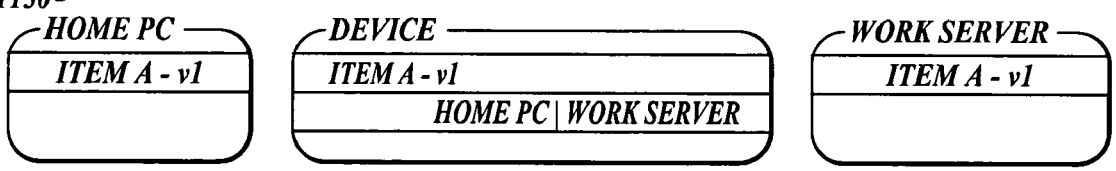
*Fig.11*

1. ITEM A HAS PREVIOUSLY CROSS-POLLINATED TO HOME PC & WORK SERVER
1210
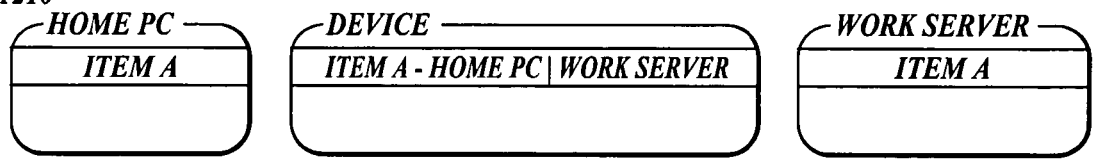
2. SYNC KEY 0 AT WORK SERVER
1220
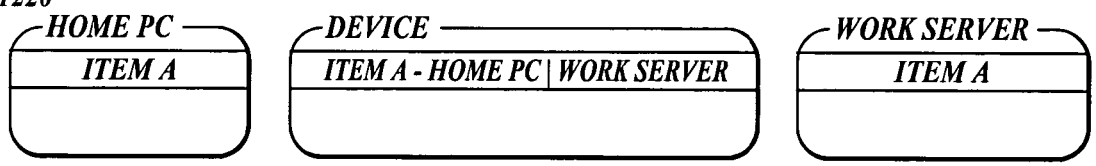
3. DELETE SERVERIDS FOR WORK SERVER
1230
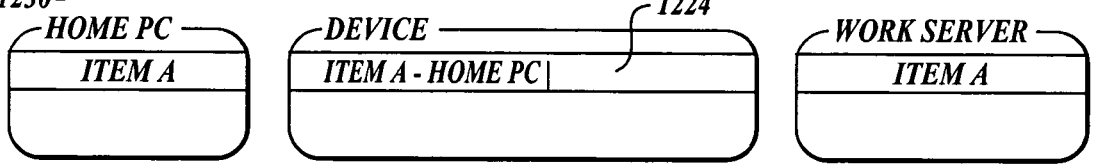
4. SYNC DOWN ITEM A FROM WORK SERVER AS AN ADD. ITEM IS DETECTED AS DUPLICATE. HOME PC VERSION IS KEPT.
1240
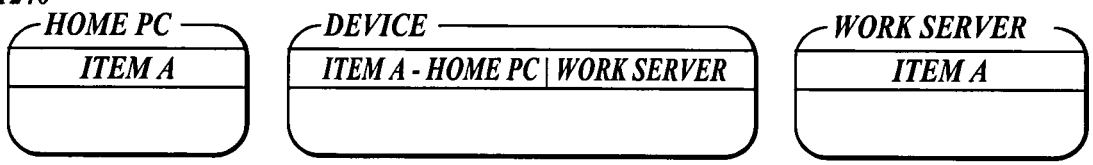
*Fig.12*

CROSS-POLLINATION OF MULTIPLE SYNC SOURCES

BACKGROUND OF THE INVENTION

Users can synchronize ("sync") one device with another. For example, a user may synchronize their work computer to their mobile device. After synchronization the mobile device and the computer include the same information that was selected to be synchronized. The basic goal of synchronization is to keep two systems current with each other. Changes that are made to one source are propagated to the other when the devices sync.

For example, when a user syncs their Contacts on their mobile device with their Home PC, then the home PC and the mobile device will have the same contacts after the synchronization has completed. Many users sync items including their email, contacts, calendar, as well as documents. It can be very difficult, however, to sync information between more than two different devices. What is needed is a way to sync with multiple sync sources.

SUMMARY OF THE INVENTION

The present invention is directed towards synchronizing a device with more than one computing device (a "sync source").

According to one aspect of the invention, the devices "cross-pollinate" their data. One of the computing devices, such as the mobile device, tracks which version of the item each data source has and synchronizes the data source to the latest version of an item. The users can selectively enable and disable cross-pollination for items and data sources.

According to another aspect of the invention, a duplicate detection algorithm helps to avoid the generation of duplicate data across the devices.

According to yet another aspect, deleting an item may be handled differently depending on the differentiation of deleted items as compared to items that are no longer in a user's filter.

According to still yet another aspect, cross-pollination may occur even though the sync sources utilize different versions of the sync protocol.

BRIEF DESCRIPTION OF THE DRAWINGS

FIG. 4 illustrates enabling and disabling cross-pollination;

FIG. 8 illustrates an exemplary duplicate detection scenario;

FIG. 10 illustrates cross-pollinating a v1 and v3 server;

FIGS. 11 and 12 show exemplary synchronization scenarios;

DETAILED DESCRIPTION OF THE PREFERRED EMBODIMENT

Throughout the specification and claims, the following terms take the meanings explicitly associated herein, unless the context clearly dictates otherwise. The term "cross-pollination" refers to mixing or co-mingling data from multiple sync sources.

Illustrative Operating Environment

Figure 1:
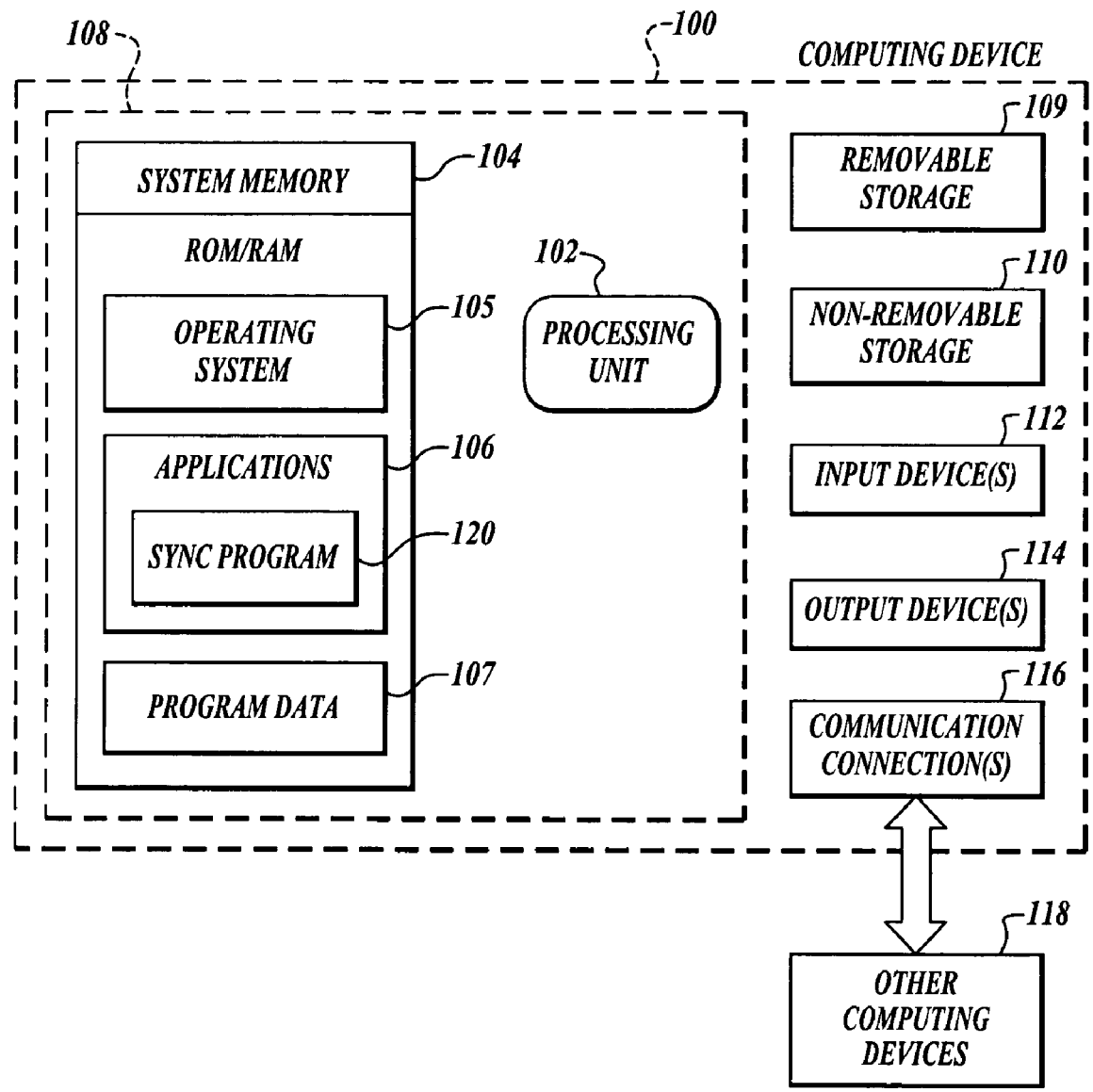
FIGS. 1 and 2 illustrate exemplary computing devices that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a sync application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
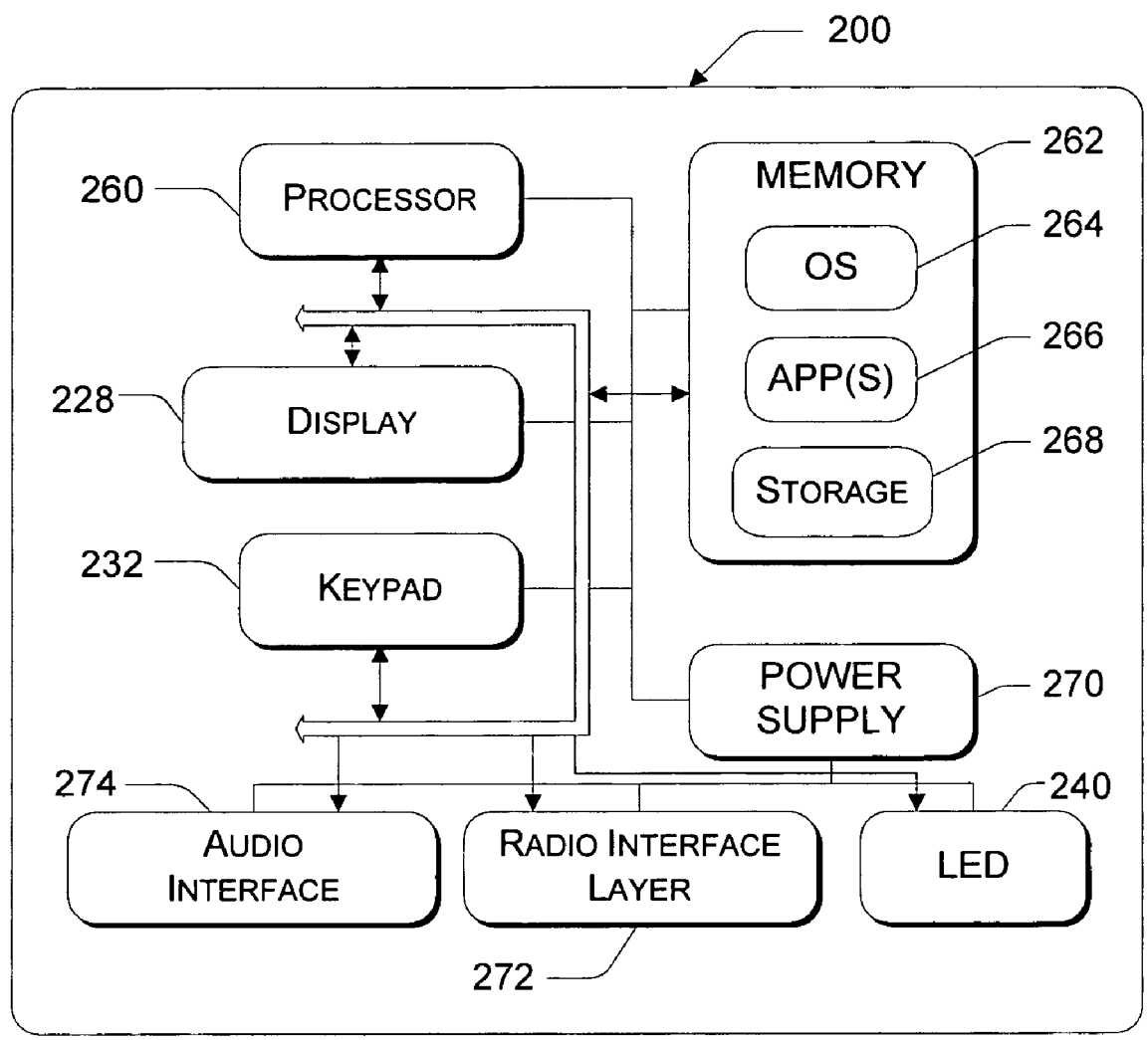

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on the operating system 264. A syncing application resides on mobile computing device 200 and is programmed to perform syncing applications. The syncing application may reside in the hardware or software of the device. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes wireless interface layer 272 that performs the function of transmitting and receiving communications. The wireless interface layer 272 facilitates wireless connectivity between the mobile computing device 200 and the outside world. According to one embodiment, transmissions to and from the wireless interface layer 272 are conducted under control of the operating system 264. In other words, communications received by wireless interface layer 272 may be disseminated to application programs 266 via operating system 264, and vice versa.

Cross-Pollination of Multiple Sync Sources

Figure 3:
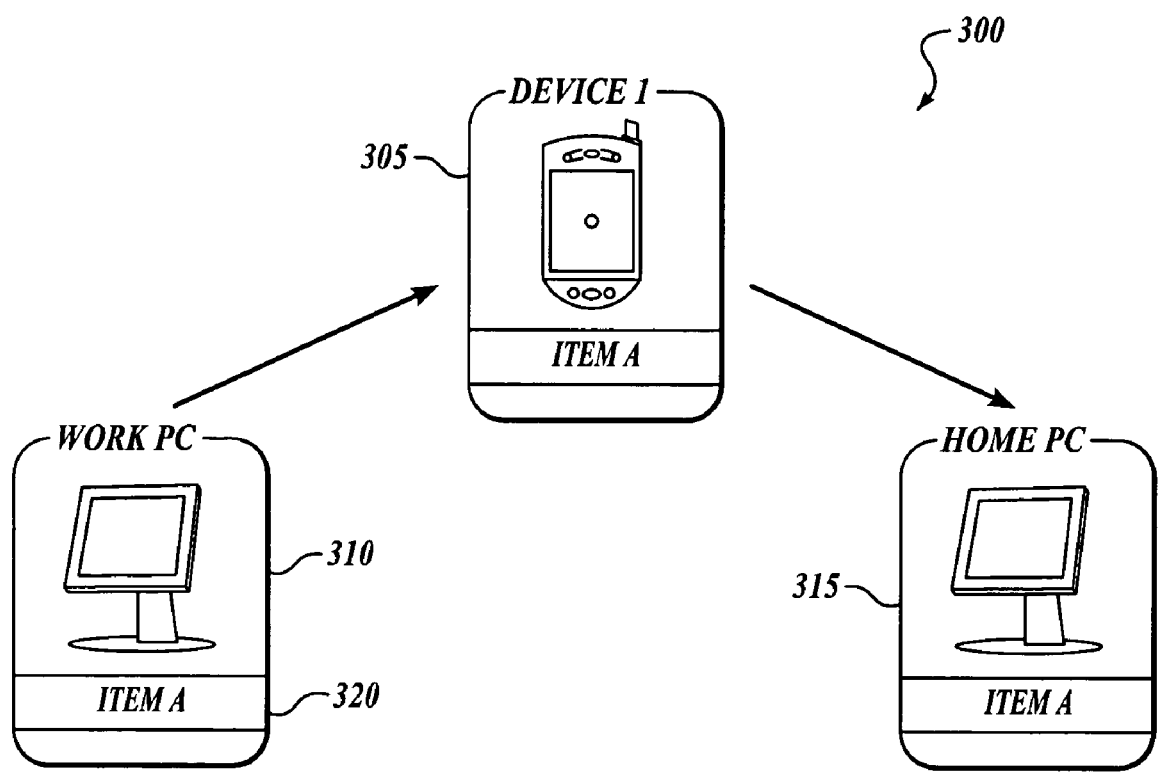
FIG. 3 shows a cross-pollination sync system.

FIG. 3 shows a cross-pollination sync system, in accordance with aspects of the invention. Users can sync a computing device, such as Device 1 (305), with more than one computing device that are each considered a "sync source."

In an exemplary cross-pollination scenario, a user typically has a single device that is synced with two sync sources. The user synchronizes the device with both sources and cross-pollination keeps the sources in sync with each other. The user's device is used to shuttle changes between the sources and resolves conflicts when changes are made to an item on multiple sources concurrently. The user's device keeps track of which version of the item each sync source has and synchronizes each of the sources to the latest version of an item.

As an example of cross-pollination, suppose a user syncs their PDA device (305) with a Home PC (315) and also with a work PC (310). Once synchronized, each of the devices (the PDA device 305, Work PC 310, and Home PC 315) will include Item A 320. When the user syncs their PDA with the Work PC, Item A is received by the PDA. When the user syncs the PDA with the Home PC, then Item A that came to the PDA from the Work PC will automatically be sent to the Home PC. Additionally, any items that were created on the Home PC will be automatically sent to the Work PC through the PDA when cross-pollination is enabled.

According to one embodiment, users may enable and disable cross-pollination between the sources. In other words, users are able to cross-pollinate between the sources or keep items separate. This cross-pollinate setting can be switched on and off at any time. For example, the user may turn off the ability to cross-pollinate with the Home PC (315). When cross-pollination is disabled to the Home PC, items from the Work PC will not move to the Home PC. In addition, a user could have one source kept separate and two other sources cross-pollinating. This flexibility aids in allowing the user to take total control of how data is synchronized.

According to one embodiment, when the device is no longer synchronizing with a single source, then all of the data is purged from the device. The data may also be left on the device. When the device is syncing with two or more sources, then the data is left on the device since it is syncing with another source. The ID column is cleared for the data source not being synchronized with and the tracking data for that source is removed.

FIG. 4 illustrates enabling and disabling cross-pollination, in accordance with aspects of the invention. Cross-pollination sync devices are aware of the sources they are syncing with. According to one embodiment, the sync source configuration information is stored on the mobile device and utilizes the AIRSYNC protocol. The configuration information may be stored at other locations and the devices may utilize other sync protocols.

According to one embodiment, administrators set policies on the device to limit the number of sources the device can sync with. This feature can be used to block cross-pollination by limiting the sources a device can sync with to a predetermined number. According to other embodiments, any authorized user may set the policies on the device.

Example 1 shows syncing one data source (Work PC 310) with PDA 305. As can be seen Item A is replicated on both devices.

Example 2 shows adding a second data source (Home PC 315). PDA 305 syncs with both the work PC and the home PC and each device includes each of the items on all of the devices. Item A, which originally was on the work PC is replicated to PDA 305 and the home PC. Item B, which originally was on the home PC is replicated to PDA 305 and the work PC.

Example 3 illustrates changing the sync settings to sync items with the Work PC that are created on the device and to not allow the Work PC and the Home PC to cross-pollinate. As can be seen, item C that was created on the device has synced with the Work PC but has not cross-pollinated to the Home PC.

Example 4 shows items created on the device sync to the Work PC and newly created items created on the home PC doe not cross-pollinate to the Work PC. In this example, item D was created on the Home PC and synced with the device, but not the Work PC.

Example 5 illustrates changing the sync settings to cross-pollinate newly created items across all of the devices. In this example, item E was created on the work PC and synced with the device and the home PC. According to one embodiment, items that are created under different sync settings maintain those sync settings. For instance, Item C and Item D that were created under the different sync settings illustrated in Example 3 and 4 are not cross-pollinated.

Example 6 shows removing the home PC sync source. According to one embodiment, any items created on the device that is removed are also removed from the other sync devices when that is the only instance of the item. In this example, Item D is removed from the device, but Item B is not removed since it was synced with the Work PC also.

Figure 5:
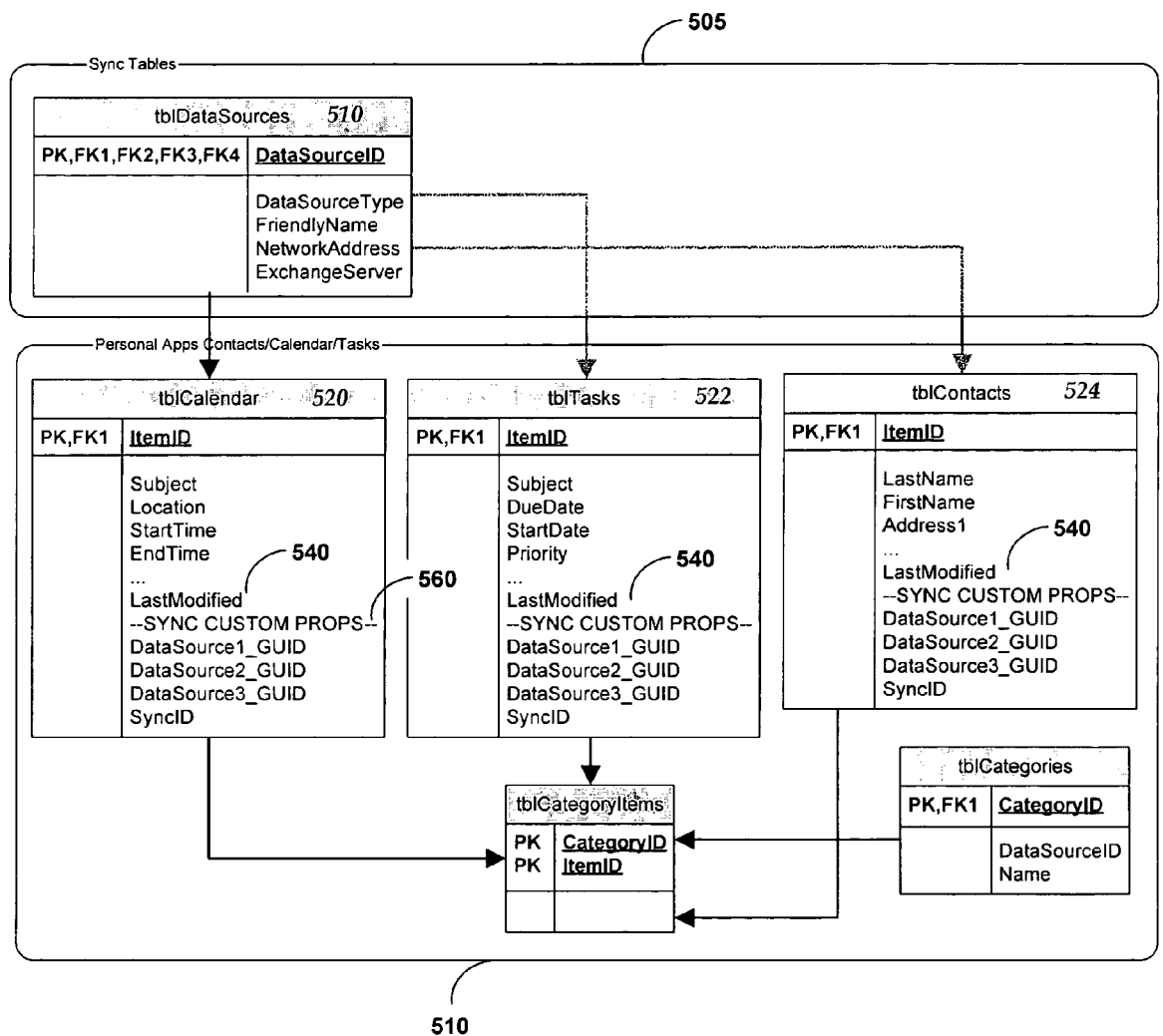
FIG. 5 illustrates an exemplary sync table architecture.

FIG. 5 illustrates an exemplary sync table architecture, in accordance with aspects of the invention. According to one embodiment, SQL-CE is used to maintain the synchronization states.

A DB File (510) contains a single table for each data type to synchronize. This example illustrates synchronizing Contacts, Calendar, and Tasks. Since changes to an item can happen in many tables, the LastModified field (540) associated with the item is updated whenever the item is edited. This helps to ensure that all changes are noted and synchronized. Changes to an item in the Item table, the Category Associations table, or any other relevant table triggers an update of the LastModified field. According to one embodiment, the value is set to the current Device Date and Time. This flag is touched upon each update to an item helping to ensure that the SQL-CE Change Tracking system properly tracks any item changes. As illustrated, a last modified column is added to the Contacts (524), Calendar (520) & Tasks tables (522). The last modified column is updated every time an item is changed.

The following is an exemplary description of the items within the tables.

| Category | Constant | Value |
|---|---|---|
| DataSourceType | alAirSyncServer | 1 |
|  | alAirSyncDesktop | 2 |

| Data Sources - Data to track for each Data Source | | |
|---|---|---|
| DataSourceID | PK, GUID | Unique Identifier per Data Source |
| DataSourceType | long | Indicates what type of Data Source this is. Used to track its capabilities |
| FriendlyName | nvarchar | Name for Data Source, used by the Apps to Identify stores |
| NetworkAddress | nvarchar | Address for Data Source. Value is set depending on Data Source Type |

According to one embodiment of the invention, custom properties (Sync Custom Props 5560) for each data source are stored in the Registry. These custom properties include the details that the sync engine tracks. According to one embodiment, the server keeps track of Username, Password, and Domain, Rules. A desktop source keeps track of Username, Password (optional), Domain, Rules, and Machine Name.

The following is a list of exemplary data source application program interfaces, according to aspects of the present invention.

| Data Source APIS | |
|---|---|
| Functionality | Description |
| Create Data Source<br>HRESULT CreateDataSource([in] UINT cProps, [in] CEPROPVALS* rgVals, [out] GUID *pDataSourceID); | Parameters:<br>DataSourceType<br>FriendlyName<br>NetworkAddress<br>ExchangeServer<br>The new Data Source is created and if successful the new DataSourceID is passed back in the OUT parameter. The friendly name passed in is unique. If the FriendlyName requested already exists an error may be returned to the calling function. |
| Edit Data Source<br><br>HRESULT GetDataSourceProps([in] GUID DateSourceID, [in] UINT cProps, [in] CEPROPVALS* rgVals);<br>HRESULT SetDataSourceProps([in] GUID DateSourceID, [in] UINT cProps, [in] CEPROPVALS* rgVals); | Pass in DataSourceID to indicate which Data Source to update. All of the properties set in the create operation can be edited. Editing any of these fields does not require a reset of the sync key |
| Delete Data Source<br><br>HRESULT DeleteDataSource([in] GUID DateSourceID); | Delete the requested Data Source and delete the column for this Data Source from the Tables. If an item was syncing but is now no longer connected to a sync source, delete the Item from the table. |
| Get Data Sources<br><br>HRESULT EnumDataSourceFirst([out] HANDLE *phEnum, [out] GUID *pDataSourceID);<br>HRESULT EnumDataSourceNext([in] HANDLE hEnum, [out] GUID *pDataSourceID);<br>Set/Retrieve Sync To Settings for Item | Retrieve and enumerate through the list of Data Sources |
| struct SyncDataSource {<br>  GUID DataSourceID;<br>  BOOL fSyncing;<br>}<br>HRESULT GetDataSourceForItem([in] GUID itemID, [in] GUID itemType, [out] SyncDataSource **ppSDS);<br>HRESULT SetDataSourceForItem([in] GUID itemID, [in] GUID itemType, [in] SyncDataSource *pSDS); | GetDataSourceForItem For new items this API is called to determine the list of Data Sources the itemType can sync to and the default values (which Data Sources a new item should sync to by default)<br>For existing items this API is called to determine the list of valid Data Sources the item can sync to and the current sync values (where the item currently is syncing to) Use this API to set the Sync To values for the itemID specified.<br>SetDataSourceForItem This function responds to several situations<br>1: New Item - set the |

-continued

| Data Source APIS | |
|---|---|
| Functionality | Description |
| | pending flags<br>2: Edit with same values - Do nothing<br>3: Edit with new values - Mark for pending delete or pending where appropriate |

Differentiation between Hard & Soft Deletes

Figure 6:
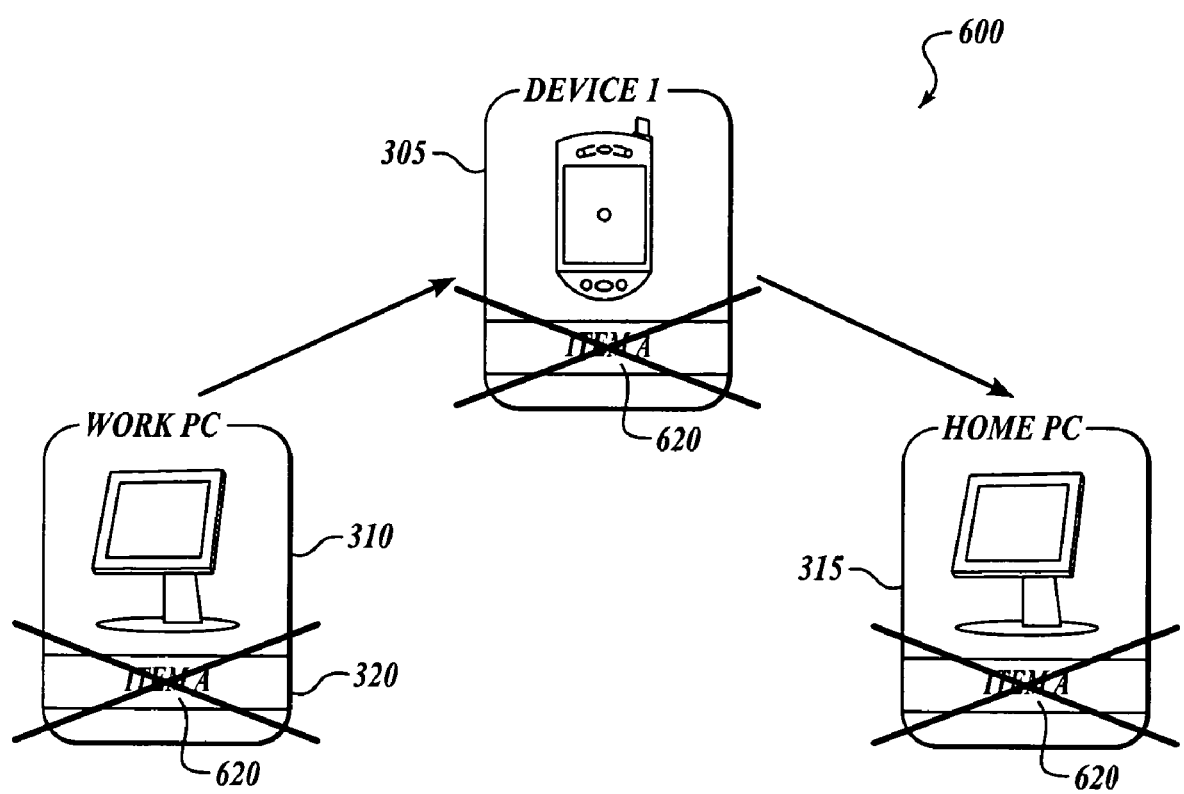
FIG. 6 illustrates a soft delete and a hard delete.

FIG. 6 illustrates a soft delete and a hard delete, in accordance with aspects of the invention. According to one embodiment, the sync protocol sends down a delete for an item if it falls out of filter (is no longer synchronized) or if it is physically deleted. According to one embodiment, filter setting for the items cross-pollinating are device-wide settings. Because of possible data loss with the propagation of out-of-filter deletes across cross-pollinating sources, a Hard Delete command is used to aid in differentiating between a Soft and Hard delete.

The term "Hard Delete" refers to physically deleting the item from each of the stores. The hard delete propagates across all cross-pollinating sources. The term "Soft Delete" refers to the fact that the item has gone out of filter. The soft delete removes the item from the device, but does not propagate the delete to any other source.

If a version of the synchronization protocol does not support soft-deletes then when a delete command is received, the device will only delete the item from its store. In other words, the delete does not cross-pollinate. Since it is possible that an Item can end up in filter since the last sync, Soft-Deletes occurs at the end of the Sync session.

For example, item 610 is soft-deleted from Server then the item will be deleted off of the Device, but not off of the Home PC, as illustrated by deletions 620. If on the other hand, the item is hard-deleted off of the work PC then Item 610 is deleted off of the device and the home PC, as illustrated by deletion 625. Delete commands are ignored when a device receives a delete command for an item that does not exist.

Duplicate Detection

Figure 7:
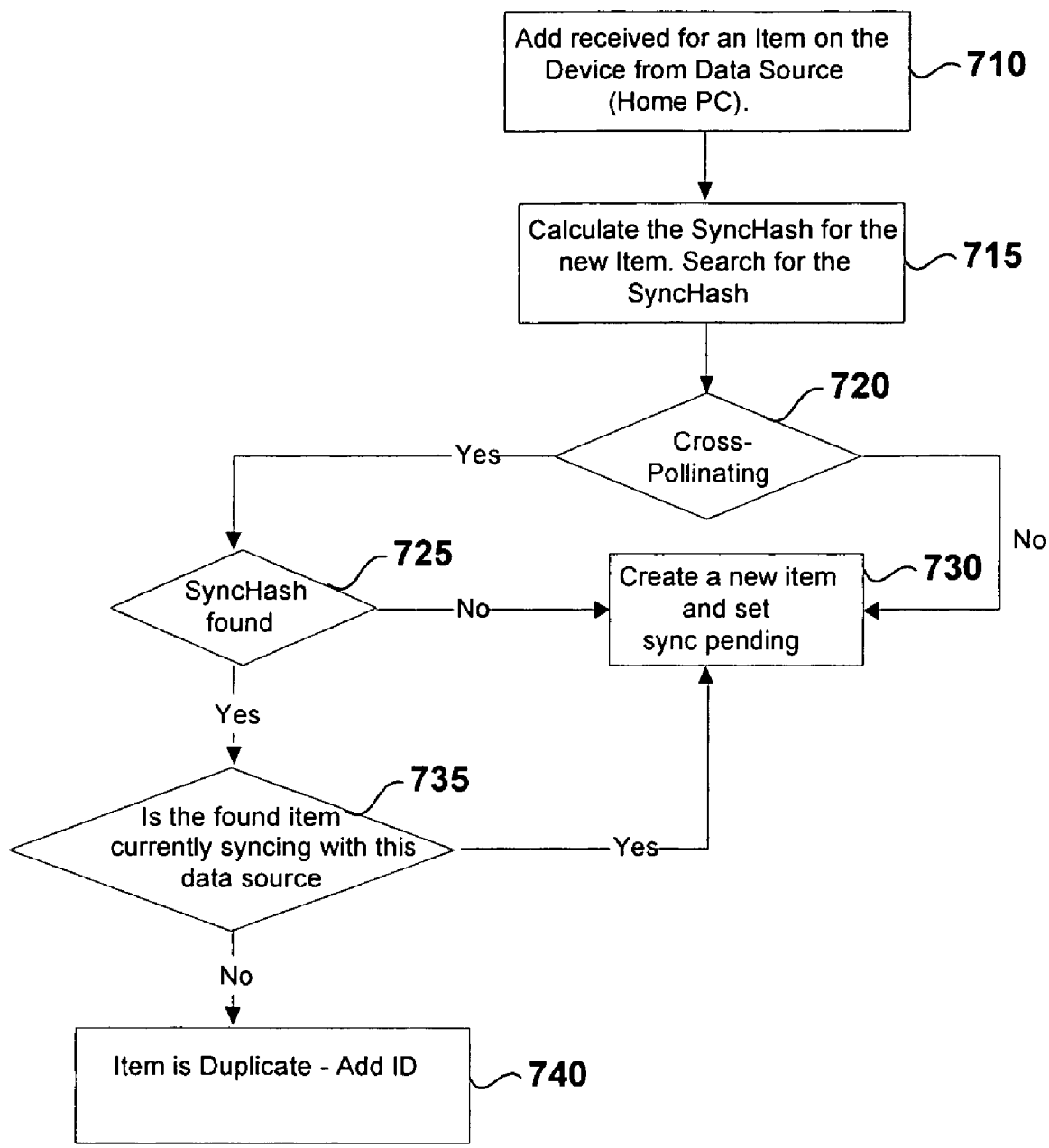
FIG. 7 illustrates processing a command to add an item to the device.

FIG. 7 illustrates processing a command to add an item to the device, in accordance with aspects of the invention. Before an item is added to a device, a duplicate detection check is completed. Performing a duplicate detection check helps to ensure that duplicates are not created on the different devices that are being cross-pollinated. According to one embodiment, the duplicate detection is based upon item property comparison and the duplicate detection code is implemented on the device (such as device 305 illustrated in FIG. 3).

At block 710, the device receives an add command from the data source being synchronized. Moving to block 715, the device calculates a hash value for the item to be added and searches a store for any other items that have the same hash value. The hash value is used to uniquely identify the item. Other ways of uniquely identifying the item may be used. Moving to decision block 720, a determination is made as to whether the device is cross-pollinating.

If the hash is located at decision block 725, then the device will consider the item a duplicate and move to decision block 735. When the sync hash is not found the process moves to block 730, where the item is added to the device and a sync pending bit is set. At decision block 735, if the found item is currently syncing with this data source then the item is created and a sync pending field is set at block 730. According to one embodiment, the Device will not consider anything to be a duplicate if the item on the device with the matching Sync Hash is already syncing with the source.

When the item is not currently synchronizing with the data source then the process moves to block 740, where the item is detected as a duplicate. At this point, the device will keep the version it already has and simply add the ID for the new item to the existing record.

FIG. 8 illustrates an exemplary duplicate detection scenario, in accordance with aspects of the present invention. Generally, when an item is added to the device, a SyncHash (810) is calculated on a subset of the items properties. Item A has a sync has value of HASHIO (815). When the device receives items to add, the device compares the SyncHash of the new item to the existing items, allowing the device to detect duplicates.

Referring to step 1, Item A has already been synced to the device from Server 1. At this point, Item A is on Server 1 and the Device with a SyncHash value of HASH101. At step 2, a user copies Item A from their device to Server1 creating Item B on device Server1. Item B has the same SyncHash value as Item A. When the device syncs with the server at step 3 Item B will be created on the device since it is already synching with the server.

Calculating the Hash

Two levels of property level matching are employed in calculating the Sync Hash.

Exact data comparison (primary keyset): A set of fields is defined as the primary properties that are compared to consider the item a duplicate. This set of fields may be different for each data type. The set of fields chosen should be able to be adapted in the code without major code change. This could include listing the fields in a header file so that the algorithms can be tuned during the test process.

Property Existence (secondary keyset: A larger set of fields, almost completely inclusive, is used to check for the simple existence of data in those properties. This helps to ensure that if a field is set in one item and is blank in another, then even if their primary key's match, the items will not be considered duplicates of one another.

Storing/Updating the Hash

When an item is first synced, the SyncHash is calculated and stored on the item. The SyncHash value is updated when an edit occurs on an item already synchronized. The following is an exemplary primary and secondary keysets for contacts, calendar, and tasks, according to one embodiment of the invention. Other properties are used to create the primary and secondary keysets for other items to be synchronized.

| Properties | |
|---|---|
| Contacts Sync Hash Algorithm | |
| Primary Keyset<br>(Exact data comparison) | FirstName<br>LastName<br>Last 4 chars of HomePhoneNumber<br>Last 4 chars of BusinessPhoneNumber<br>(If less than 4 digits use whatever exists) |
| Secondary Keyset<br>(Property Existance) | Anniversary, AssistantName,<br>AssistnamePhoneNumber, Birthday, Body,<br>Business2PhoneNumber, BusinessCity,<br>BusinessCountry, BusinessPostalCode, |

-continued

| Properties | |
|---|---|
| | BusinessState BusinessStreet, BusinessFaxNumber, CarPhoneNumber, CompanyName, Department, Email1Address, Email2Address, Email3Address, FileAs, Home2PhoneNumber, HomeCity, HomeCountry, HomePostalCode, HomeState, HomeStreetm HomeFaxNumber, JobTitle, MiddleName, MobilePhoneNumber, OfficeLocation, OtherCity, OtherCountry, OtherPostalCode OtherState, OtherStreet, PagerNumber, RadioPhoneNumber, Spouse, Suffix, Title, WebPage, YomiCompanyName, YomiFirstName, YomiLastName |
| Calendar SyncHash Algorithm | |
| Primary Keyset (Exact data comparison) | UID, StartTime, Location, Subject |
| Secondary Keyset (Property Existance) | AllDayEvent, Email, Name, DtStamp, EndTime, Deleted, ExceptionStartTime, MeetingStatus, OrganizerEmail, OrganizerName, Recurrence, Type, Until, Occurrences, Interval, DayOfWeek, DayOfMonth, WeekOfMonth, MonthOfYear, Reminder |
| Tasks SyncHash Algorithm | |
| Primary Keyset (Exact data comparison) | Subject, DueDate, Categories |
| Secondary Keyset (Property Existance) | StartDate, CompletedDate, Importance, IsComplete, IsRecurring, Sensitivity, ReminderSet, ReminderTime, Body |

If an Item is marked for cross-pollination, the data available on the device will cross-pollinate to the other Data Sources. Truncated versions of an item may cross-pollinate because of device limitations. According to one embodiment, the text [Message Truncated] is added to the end of the Notes field when truncation occurs. Users will therefore be aware that they do not have the complete original copy The sync engine on the device first requests all Adds from the Data Source. It then sends up to the Data Source all Adds that still remain (the duplicated adds have been marked and therefore will not be issued).

According to one embodiment, an Item on the Device tracks three properties. The ServerID values and SyncHash will be stored as custom properties on each Item.

| | Description |
|---|---|
| Property | |
| ItemID | This is used to identify the item |
| ServerID1 ... N | This is the ID that identifies the item at the Server/Desktop The Item can have multiple Server IDs stored as custom properties in the Item. |
| SyncHash | This is the sync hash value used to detect duplicates. This value is calculated/re-calculated each change The ServerID property has four states: |
| Sync State | |
| Sync Pending | Item is on Device and not yet synced to the target Data Source. The Item is created on the Data Source upon next sync. |
| Valid ServerID | The Items ServerID is stored to allow for proper mapping with the Data Source |
| Pending Delete | The Item has synced in the past to this Data Source but the user has requested that it no longer sync there. |

-continued

| | Description |
|---|---|
| | On the next sync delete the item from the Data Source and clear the property |
| Not Syncing | The Item is not syncing with this Data Source |

Figure 9:
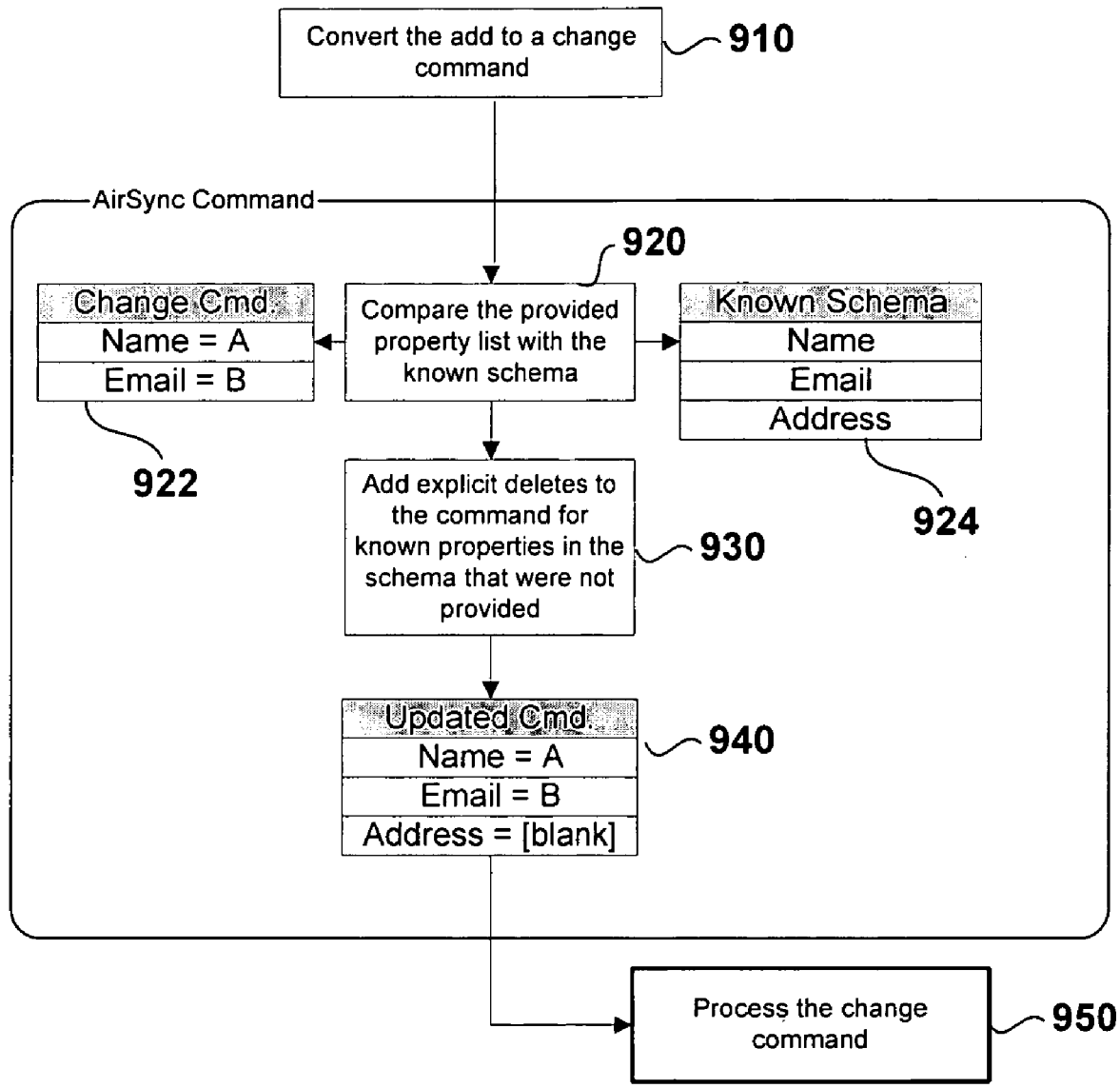
FIG. 9 shows processing an add command for a duplicate of an existing item on the Device.

FIG. 9 shows processing an add command for a duplicate of an existing item on the Device, in accordance with aspects of the present invention. For an item that is considered a duplicate, the process moves to block 910 where the add command is converted to a change command. Instead of copying the entire item to the device, the item is updated. At block 920, the property list is compared with the known schema. Flowing to block 930, explicit deletes are added to the change command for the known properties that were not provided. Block, 940 illustrates the updated command. At block 950, the change command is processed.

Cross-Pollination across Different Sync Versions

Property level change tracking is implemented in order to aid in supporting multiple synchronization protocol versions cross-pollinating, and minimize unnecessary writes. Each sync provider is responsible for knowing the property set it syncs and for only initiating a sync when a change occurs in properties that it cares about. Because a sync provider only changes properties that it is aware of, it is possible that an item on the device will contain a merged set of properties, some properties from the a v1 server and the other properties that only the v3 server syncs.

FIG. 10 illustrates cross-pollinating a v1 and v3 server, in accordance with aspects of the invention. Different versions of sync protocols support different properties. In the example illustrated, the V1 protocol supports properties A and B, whereas the V3 protocol supports properties A, B, and Z.

Initially, the Device has not been synchronized with the V1 Server or the V3 server. At 910, the device first syncs with the V1 server and receives items A and B. Next, at 920, the device syncs with the V3 server. Items A and B are detected as duplicates and items A, B, and Z are synchronized to the Device. At 930, when the device syncs with the V1 server again no synchronization occurs since item Z is the only change and it is not supported by the V1 server.

FIG. 11 shows an exemplary synchronization scenario, in accordance with aspects of the present invention. Step 1110 illustrates that Item A has previously cross-pollinated with the Home PC and the Work Server. At 1120, Item A is edited creating version 2 (v2) of Item A. The Device syncs with the work server at 1130 where version 2 is synced to the device. Next, at block 1140 the device syncs with the Home PC. Since the Device is set to server wins Item A (version 1) is now on the device. When the device syncs with the Work Server again there is no conflict and Item A—version 1 is now on the work server (1150).

FIG. 12 shows an exemplary synchronization scenario, in accordance with aspects of the present invention. Step 1210 illustrates that Item A has previously cross-pollinated with the Home PC and the Work Server. At 1220, it is identified that the sync key has a value of zero at the work server. The user is cross-pollinating so the Work Server ID is deleted (1224) at block 1230. Moving to block 1240, The synchronization is started from scratch and the device receives an add command requesting to add Item A to the device. The item is detected as a duplicate, and the item from the Home PC is kept. The work server ID is added to the Item tag.

Creating a Data Source

Figure 13:
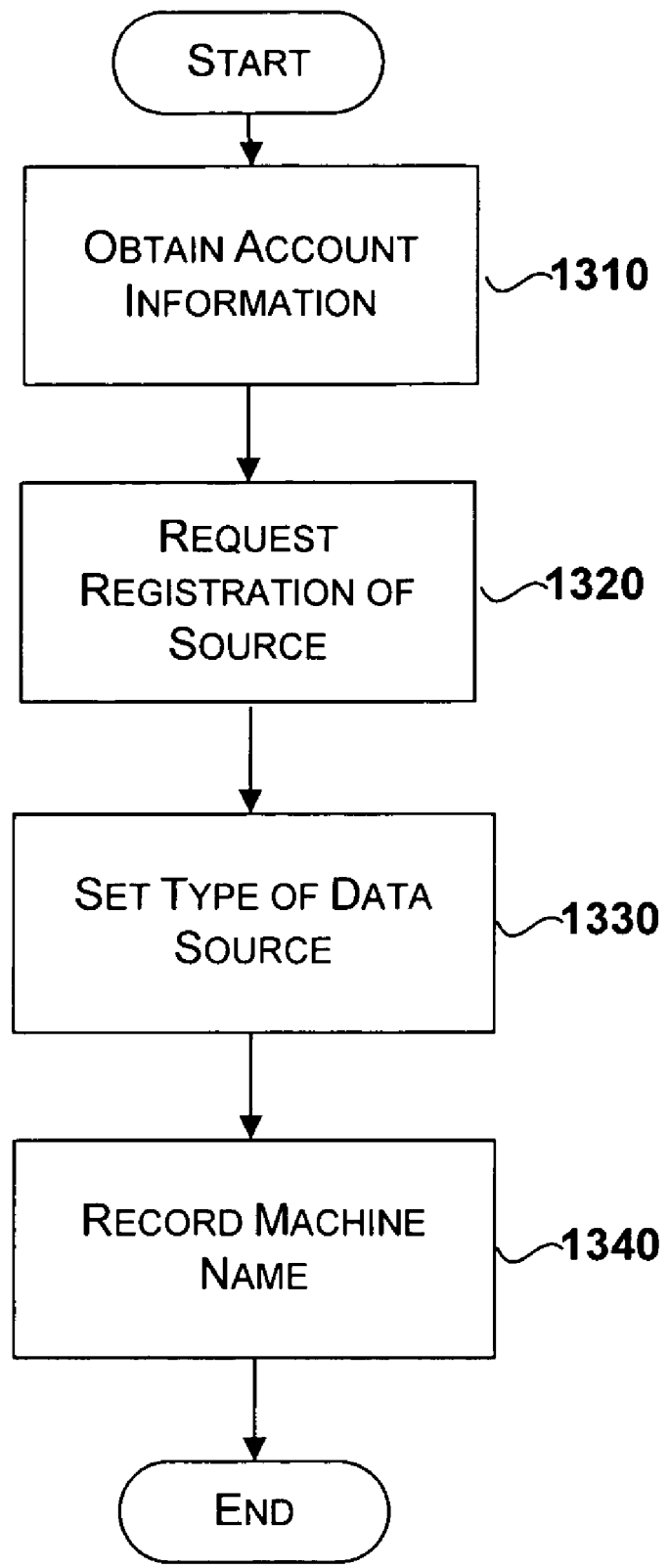
FIG. 13 illustrates Data Source Creation.

FIG. 13 illustrates Data Source Creation, in accordance with aspects of the present invention. After a start block, the process moves to block 1310, where account information for the new data source is obtained. Flowing to block 1320, a request is made to register a new data source with the system. At block 1330, the data source type is set to a type associated with the data source. According to one embodiment, the data source type relates to the type of device, i.e. DesktopSync and ServerSync. Next, at block 1340, the machine name is recorded. This helps to allow the device the ability to reconnect to the desktop (in most cases) if the Desktop Sync Information is lost. The process then moves to an end block and returns to processing other actions.

Removing a Data Source

Figure 14:
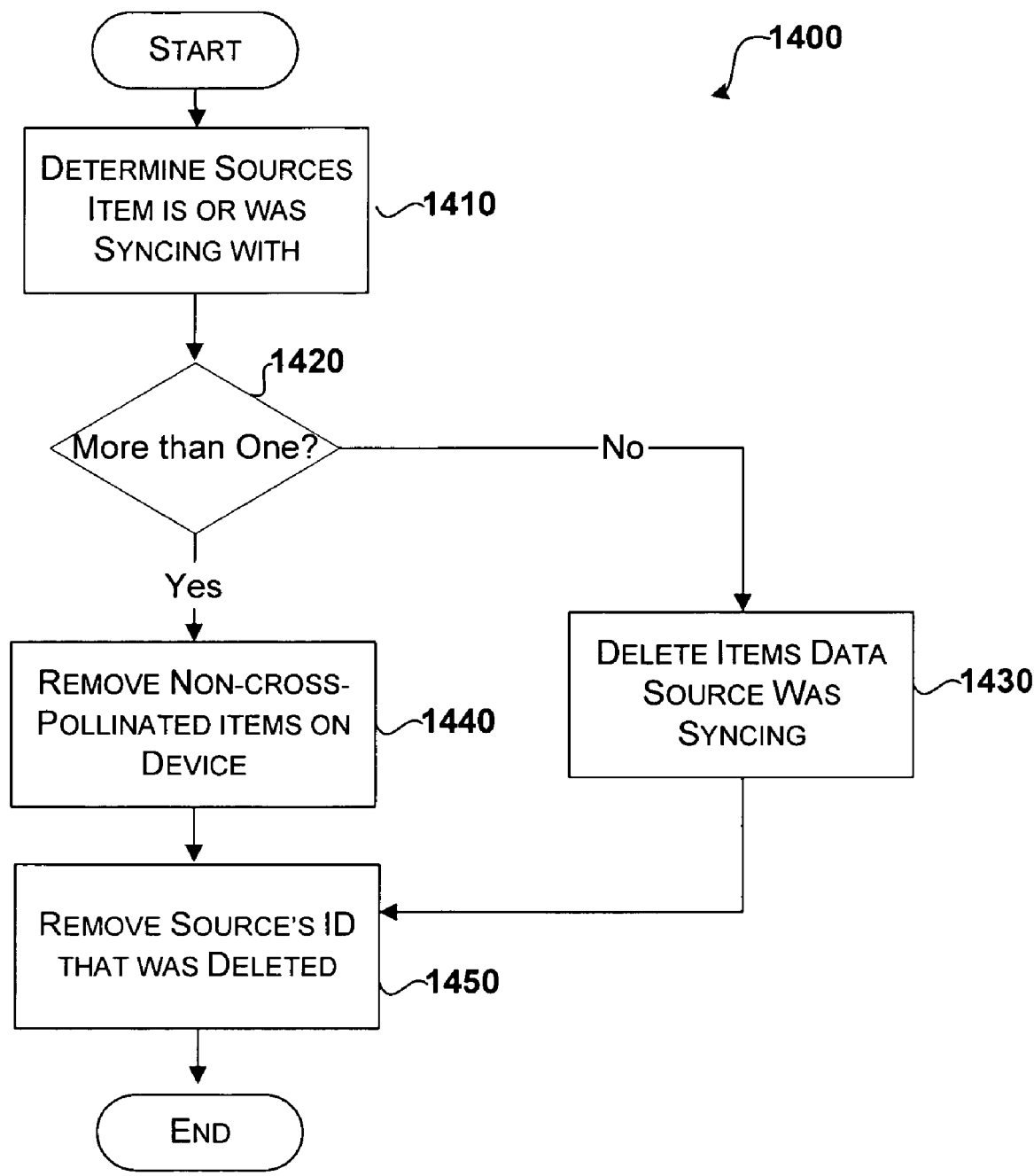
FIG. 14 shows a process for removing a data source.

FIG. 14 shows a process for removing a data source, in accordance with aspects of the present invention. Deleting a Data Source deletes the Data Source and all of the items that the Data Source was syncing. If an Item was syncing, or is pending sync, with more than one Data Source, then the item will not be deleted.

After a start block, the process moves to block 1410 where a determination is made as to how many sources the device is syncing with. Moving to decision block 1420, when there is only one data source, the process moves to block 1430 where the items being synced with the deleted data source are removed from the device. When there is more than one device, the process moves to block 1440 where the non cross-pollinated items on the device are removed. Transitioning to block 1450, the source's ID that was deleted is removed from the device. According to one embodiment, the custom columns for this Data Source are removed from the application tables. According to one embodiment, a warning message is provided to the user before removing any data.

The following is an example to further clarify. Suppose, a device is syncing its Contacts, and Calendar with a first source and the device is syncing Calendar and Tasks with a second source. The user then deletes the first source. As a result of removing the first source, all of the contacts are purged from the device. The calendar items and tasks are left on the device and the IDs for the first source are removed.

Reconciling Data Source Information that is Out of Sync

Figure 15:
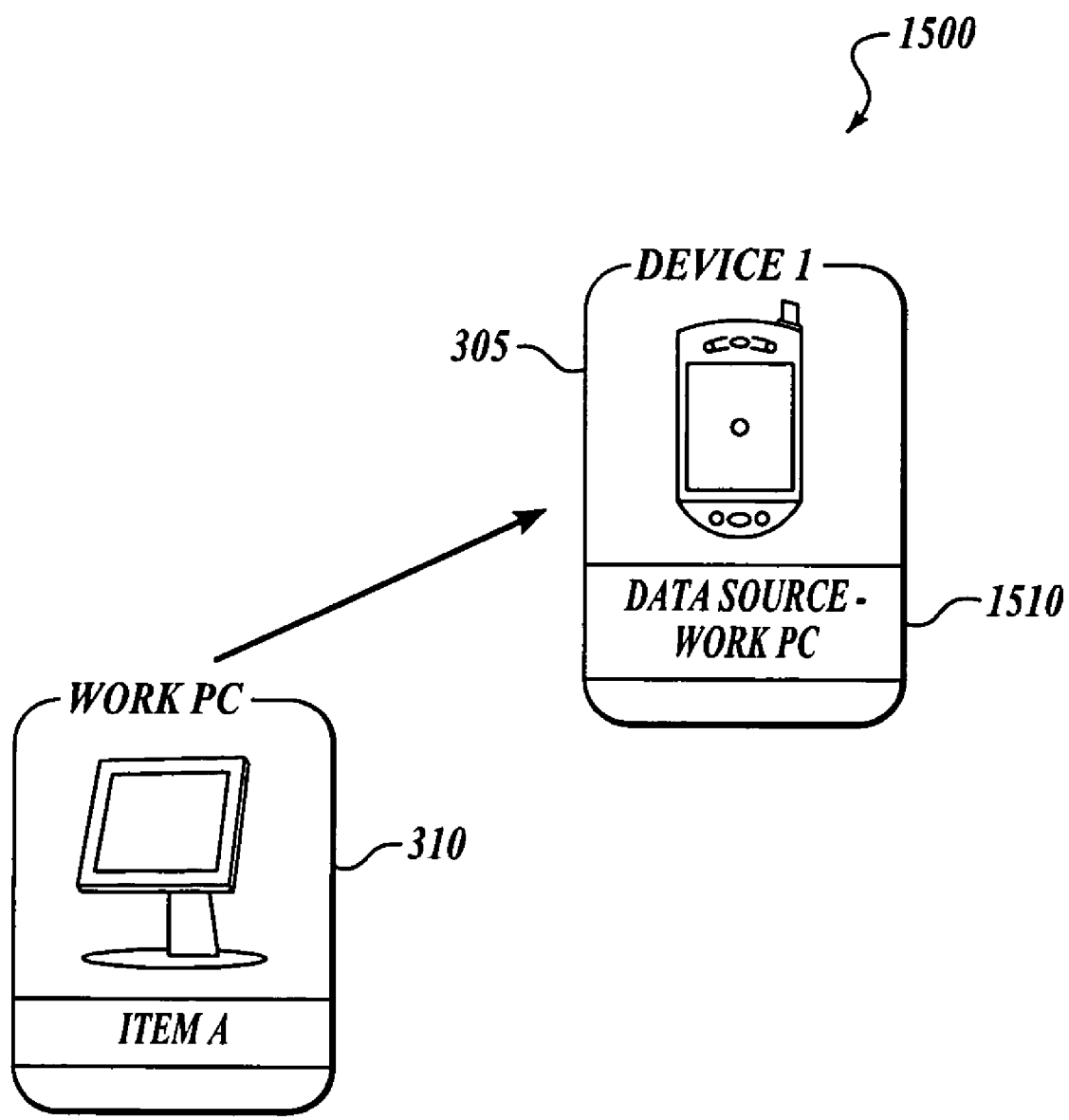
FIG. 15 illustrates reconciling data source information that is out of sync, in accordance with aspects of the invention.

FIG. 15 illustrates reconciling data source information that is out of sync, in accordance with aspects of the invention.

The following examples will be used to illustrate. A Data Source (Work PC) exists on the device that the Work PC is no longer aware of. This can occur for many reasons. For example, it can occur if the user has to reinstall the synchronization program or rebuild the machine. When the device connects to the desktop, the desktop notices that the device already has a data source setup to sync with it (1510). This is determined by comparing the network machine name of the Data Source on the Device with the name of the Work PC. The existing Desktop Source is deleted and a new one is created.

A Data Source exists on the Desktop that the Device is no longer aware of. This can occur, for example, if the device cold boots. By comparing the DeviceID stored on the Desktop for the Data Source with the device's DeviceID it can be determined that the device used to sync with the desktop and a determination is made as to whether the device should be set up again to sync with the desktop. If the user says 'yes', a new data source iscreated for the user.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for synchronizing a device with data sources and allowing cross-pollination of the data sources, comprising:

creating a first data source and a second data source;

automatically determining items to synchronize between the first data source, the second data source and the device; wherein the first data source, the second data source and the device are user devices that are associated with a particular user; wherein the items comprise user created items; wherein the device is configured to determine a version of each item on the first data source and the second data source and synchronize each of the first data source and the second data source to a latest version of each item;

connecting the device to the first data source;

synchronizing the device with the first source such that the device and the first source each include a same version of the items after the synchronizing;

connecting the device to the second source;

synchronizing the device with the second source, wherein the device is used to cross-pollinate between the first data source and the second data source such that the first data source, the second data source and the device each include the same version of the items after the synchronizing and cross-pollinating; and performing a duplicate detection check to determine when an item has already been synchronized.

2. The method of claim 1, wherein performing the duplicate detection check further comprises performing a property comparison.

3. The method of claim 1, wherein performing the duplicate detection check further comprises calculating a sync hash value.

4. The method of claim 1, further comprising updating the item when the item has already been synchronized.

5. The method of claim 1, further comprising receiving a delete command and performing the delete command, wherein the delete command is selected from a soft delete and a hard delete.

6. The method of claim 1, further comprising restricting cross-pollination between the data sources.

7. The method of claim 1, wherein creating the first data source and the second data source further comprises indicating a data source type and storing an identifier associated with each of the first data source and the second data source.

8. The method of claim 1, wherein synchronizing the device with the first data source may use a first synchronization protocol and synchronizing the device with the second protocol may use a second synchronization protocol.

9. A computer-readable storage medium storing instructions when executed by a processor for cross-pollinating data sources, comprising:

creating a first data source to synchronize with a device and creating a second data source to synchronize with the device, wherein the first data source, the second data source and the device are devices utilized by a particular user;

connecting the device to the first data source having first items to synchronize with the device;

determining first items to synchronize between the first data source and the device; wherein the first items comprise user created items;

synchronizing the device with the first source such that the device and the first data source each include a same version of the first items after the synchronizing;

after synchronizing the device with the first data source connecting the device to the second data source; wherein the device is configured to determine a version of each item on the first data source and the second data source and synchronize each of the first data source and the second data source to a latest version of ach item;

determining second items to synchronize between the second data source and the device; wherein determining the first items to synchronize and determining the second items to synchronize include examining a SyncHash value that is calculated for each of the items and is stored with each of the items; wherein the SyncHash value that is calculated for each item includes two levels of property level matching when the SyncHash value is calculated consisting of a primary keyset that is a set of fields that is defined as the primary properties that are compared to consider when an item is a duplicate and a second keyset that is a larger set of fields that is used to check for an existence of data in those properties that even if the primary keysets match between two items, the two items are not duplicates of one another;

synchronizing the device with the second source such that the device and the second data source each include a same version of the second items after the synchronizing; wherein each the second data source includes updates to the first items that were synchronized between the device and the first data source; wherein the second items that are synchronized with the device are synchronized with the first device when the device is synchronized again with the fist data source; and performing a duplicate detection check to determine when an item has already been synchronized.

10. The computer-readable medium of claim 9, wherein performing the duplicate detection check further comprises calculating a sync hash value.

11. The computer-readable medium of claim 10, further comprising receiving a delete command and performing the delete command, wherein the delete command is selected from a soft delete and a hard delete, wherein the hard delete physically deletes the item and wherein the hard delete propagates across each of the data sources and the device such that the item is removed from the device, the first data source and the second data source; wherein a soft delete is an item that has gone out of filter, wherein the soft delete removes the item from the device and one of the data sources but does not remove the item from the other one of the data sources.

12. The computer-readable medium of claim 11, further comprising restricting cross-pollination between the data sources.

13. The computer-readable medium of claim 12, wherein creating the the first data source and the second data source further comprises indicating a data source type and storing an identifier associated with each of the data sources.

14. The computer-readable medium of claim 11, wherein synchronizing the device with the first data source uses a first synchronization protocol and synchronizing the device with the second data source uses a second synchronization protocol.

15. A system having a processor for cross-pollinating data sources, comprising:

at least two data sources including a first data source and a second data source that may cross-pollinate each other; and a device that is configured to act a shuttle between the at least two data sources to cross-pollinate, and that is configured to synchronize with the at least two data sources such that after synchronizing and cross-pollinating, the device and the at least two data sources include a same version of items that were selected to be synchronized; wherein the data sources and the device are user devices that are associated with a particular user; wherein the items comprise user created items; wherein the device is configured to determine a version of each item on the data sources and synchronize each of the data sources to a latest version of each item; wherein the device is first synchronized with the first data source such that the device and the first source each include a same version of the items after the synchronizing; after synchronizing the device with the first data source, synchronizing the device with the second source, such that the first data source, the second data source and the device each include the same version of the items after the synchronizing; and during the synchronization of the first data source and the second data source performing a duplicate detection check to determine when an item has already been synchronized.

16. The system of claim 15, wherein performing the duplicate detection check further comprises calculating a sync hash value.

17. The system of claim 15, wherein the device is configured to process a soft delete command and a hard delete command.

18. The system of claim 17, wherein the device is further configured to restrict cross-pollination between the at least two data sources.

19. The system of claim 18, wherein synchronizing the device with the at least two data sources may use more than one synchronization protocol.

* * * * *